June 5, 1956 W. C. LARSEN 2,748,484
TOOL FOR HOLDING DENTAL FACINGS
Filed Jan. 27, 1954
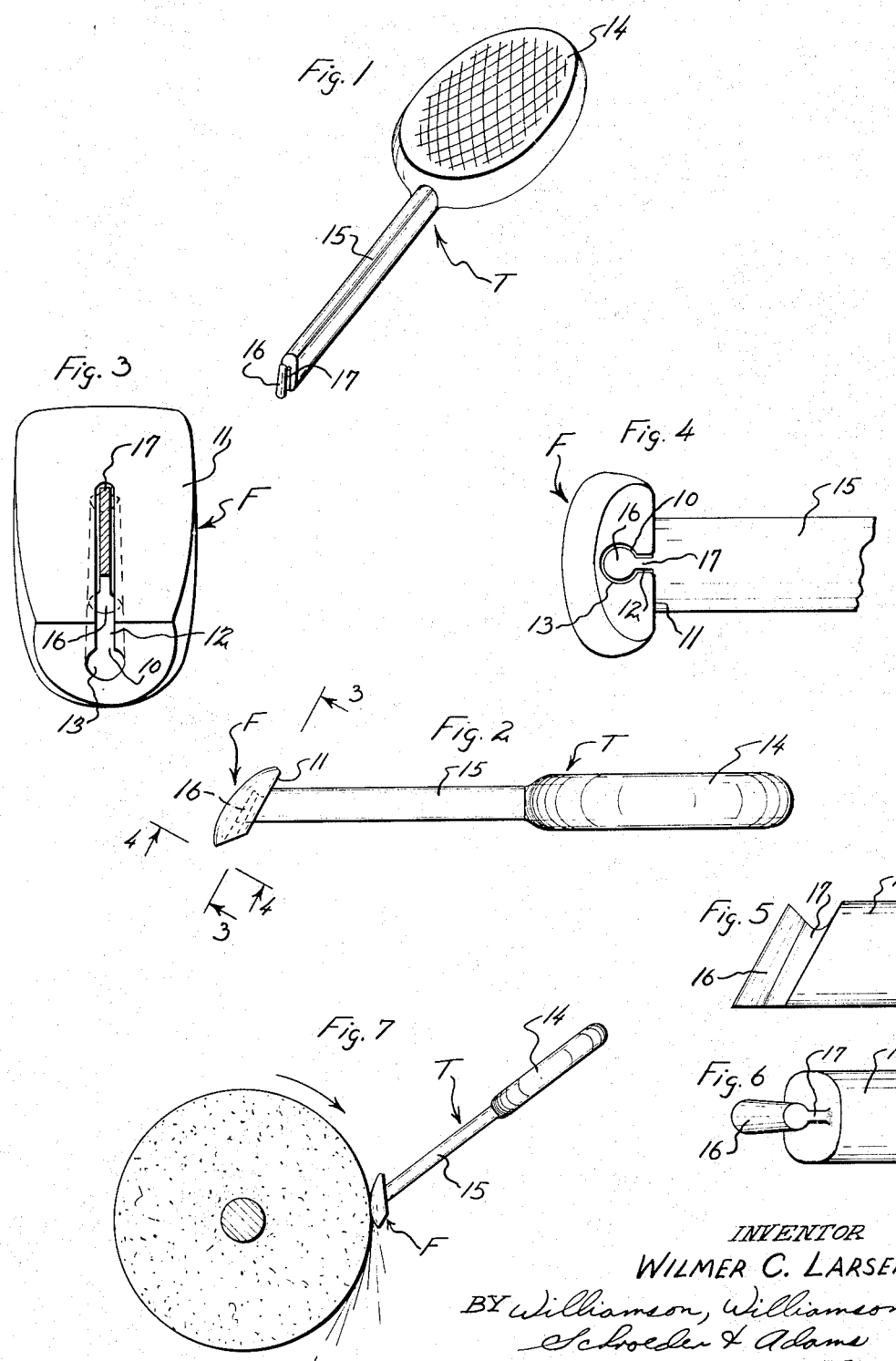
INVENTOR
WILMER C. LARSEN
BY Williamson, Williamson,
Schroeder & Adams
ATTORNEYS

United States Patent Office 2,748,484
Patented June 5, 1956

2,748,484

TOOL FOR HOLDING DENTAL FACINGS

Wilmer C. Larsen, Fairmont, Minn.

Application January 27, 1954, Serial No. 406,417

1 Claim. (Cl. 32—68)

This invention relates to dental tools, and more specifically to a tool for holding dental facings.

In order to restore the glaze on dental facings, they must be polished and buffed. Generally a high speed rotary buffing wheel is used to do this work. But it is difficult to hold a facing against such a buffing wheel because the facing is so small and smooth-surfaced.

A general object of my invention is to provide a tool for holding a dental facing which is of simple and inexpensive construction and operation.

Another object of my invention is to provide a tool for holding a dental facing to which a facing is easily and readily attached and from which the facing is easily and readily detached.

Still another object of my invention is to provide a tool which will hold a dental facing without scratching or defacing the outer surface thereof and without injuring the internal structure of the facing.

A further object of my invention is to provide a tool which will securely hold a dental facing without covering any of the surface thereof which is to be buffed and polished.

These and other objects and advantages of my invention will more fully appear from the following description made in connection with the accompanying drawings wherein like reference characters refer to the same parts throughout the several views and in which:

Figure 1 is a perspective view of the tool;

Figure 2 is a side elevational view of the tool having a dental facing attached thereto;

Figure 3 is a view taken at 3—3 of Figure 2;

Figure 4 is a view taken at 4—4 of Figure 2;

Figure 5 is an enlarged detail view in side elevation;

Figure 6 is an enlarged detail view in top elevation; and

Figure 7 is a diagrammatic representation of the tool holding a dental facing against a buffing wheel.

In the shown embodiment of my invention, I provide a tool T which holds a dental facing F by means of its mounting recess. Almost every dental facing has an elongated recess 10 formed in one of its rear surfaces 11. The recess extends from medially of the surface to one end thereof to provide one closed end and one open end. The recess comprises a narrow neck portion 12 which is adjacent to the surface 11, and an enlarged portion 13 which is disposed inwardly of the neck portion 12.

The tool T for holding the dental facing F comprises a handle 14, and a rigid shank 15 which is affixed at one of its ends to the handle. A suitable anchoring element 16, such as a generally cylindrical bead which may be frusto-conically tapered, is affixed by suitable means, to be hereinafter described, to the other end of the shank. The anchoring element 16 extends generally transversely of the shank. The anchoring element 16 is of such size as to be inserted in the enlarged portion 13 of the mounting recess 10 in the dental facing F, and to tightly engage the walls of the recess 10. The anchoring element 16 may be made of a somewhat resilient material to insure a tightly gripping relationship between the element 16 and the walls of the recess 10 when the element 16 is inserted therein.

The anchoring element 16 is affixed to the shank 15 by means such as a rigid web 17 or rib. The thickness of the web is substantially less than the diameter of the anchoring element 16 and is such that the web may be inserted in the neck portion 12 of the mounting recess 10. The web 17 is affixed along one of its longitudinal edges to the shank. The anchoring element 16 is affixed to the other longitudinal edge of the web and in such a direction whereby the axis of the anchoring element 16 lies in the plane of the web 17.

The tool T is attached to the dental facing F by inserting one end of the anchoring element 16 into the open end of the mounting recess 10. The anchoring element 16 is shifted into enlarged portion 13 of the recess 10, and the web 17 is inserted into the neck portion 12 of the recess 10. The anchoring element 16 will engage the walls of the recess 10 to securely hold the facing F on the tool T.

It will be seen that I have provided a tool of simple and inexpensive construction and operation which will securely hold a dental facing. The anchoring element of the tool tightly engages the inner surface of the mounting recess in the facing.

It will also be apparent that I have provided a tool which is easily attached to a dental facing for securely holding it and which is easily detached from the facing. The anchoring element is merely slipped into the mounting recess to attach the tool to the facing, and the element is merely pulled out of the recess to detach the tool from the facing.

It should also be noted that because the anchoring element engages the dental facing in its mounting recess, the outer surface of the facing will not be defaced or scratched by the tool. And for this same reason, the tool will not chip or otherwise injure the internal structure of the facing. The anchoring element does not contact or cover any of the outer surface of the dental facing, and, therefore, all of the surface area of the facing is exposed to be polished or buffed when the facing is held by my tool.

It will, of course, be understood that various changes may be made in the form, detail, arrangement and proportion of the parts without departing from the scope of my invention.

What I claim is:

A tool for holding a dental facing of the type having an elongated mounting recess with an enlarged interior portion and one open end, said tool comprising an elongated handle, and a rigid interconnecting web having one of its longitudinal edges affixed to said handle, a resiliently yieldable and frusto-conically tapered head extending longitudinally of said web and affixed thereto, said web and bead being adapted to be inserted into such a mounting recess of a dental facing.

References Cited in the file of this patent

UNITED STATES PATENTS

| 1,369,718 | Steele | Feb. 22, 1921 |
| 1,766,235 | Wells | June 24, 1930 |